United States Patent [19]

Mis

[11] E Re. 31,384

[45] Reissued Sep. 20, 1983

[54] BED FRAME ASSEMBLY

[75] Inventor: Frank J. Mis, Oaklawn, Ill.

[73] Assignee: Harris-Hub Company, Inc., Harvey, Ill.

[21] Appl. No.: 99,860

[22] Filed: Dec. 3, 1979

Related U.S. Patent Documents

Reissue of:

[64] Patent No.: 4,007,502
Issued: Feb. 15, 1977
Appl. No.: 636,360
Filed: Dec. 1, 1975

[51] Int. Cl.[3] ..... A47C 19/02; A47C 21/00

[52] U.S. Cl. ..... 5/202; 5/184; 5/310

[58] Field of Search ..... 5/181, 184–186, 5/200 R, 202, 207, 279 C, 282, 285, 286, 310, 201; 248/188 T; 312/255, 256

[56] References Cited

U.S. PATENT DOCUMENTS

| | | | |
|---|---|---|---|
| 2,470,397 | 5/1949 | Horter | 248/188.7 |
| 2,527,603 | 10/1950 | Wallance | 312/256 |
| 2,553,890 | 5/1951 | Bloch | 248/188.7 |
| 2,776,180 | 1/1957 | Knuepfer | 5/310 |
| 2,883,680 | 4/1959 | Roche | 5/202 |
| 3,114,917 | 12/1963 | Bogar, Jr. | 5/202 |
| 3,537,114 | 11/1970 | Mis | 5/201 |
| 3,555,579 | 1/1971 | Harris | 5/201 |
| 3,646,623 | 3/1972 | Harris et al. | 5/181 |
| 3,683,429 | 8/1972 | Mis | 5/201 |
| 3,803,644 | 4/1974 | Harris | 5/181 |
| 3,995,334 | 12/1976 | Harris | 5/181 |

*Primary Examiner*—Alexander Grosz
*Attorney, Agent, or Firm*—Dressler, Goldsmith, Shore, Sutker & Milnamow, Ltd.

[57] ABSTRACT

Caster wheel supports for a bed frame comprising a pair of interlocking components in which male and female elements are provided on the cross and side frame members respectively for detachably securing them to one another, these elements being inclined and sloping upwardly and outwardly toward the sides of the frame, the male members serving to dispose the caster wheels mounted thereon inwardly of the side frames to provide foot clearance to prevent a person walking alongside the bed from stubbing his toes. The novel construction also provides improved reinforcement for the corners of the bed and also disposes the side frame and cross-frame bed support surfaces at a common level.

4 Claims, 7 Drawing Figures

FIG. 1
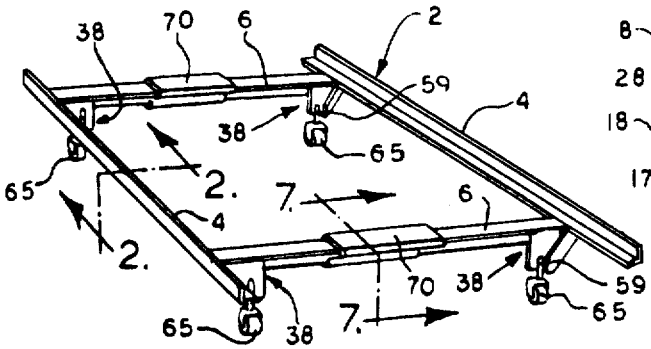
FIG. 2
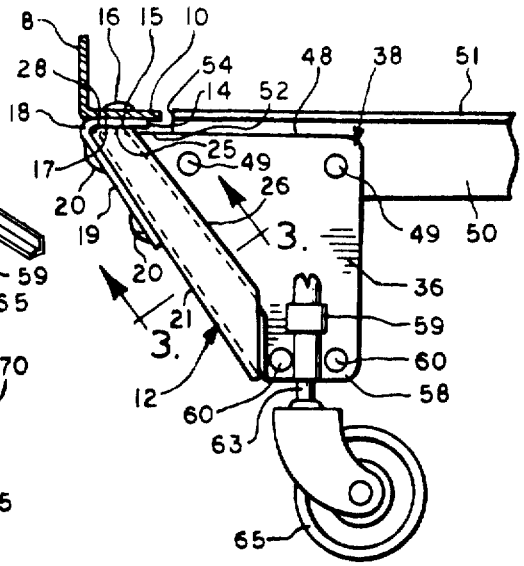
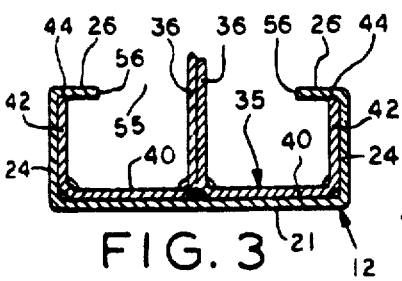
FIG. 3
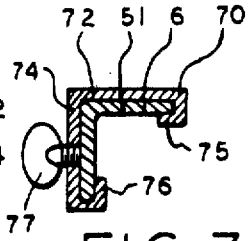
FIG. 7
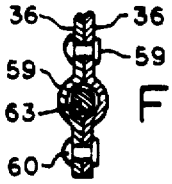
FIG. 6
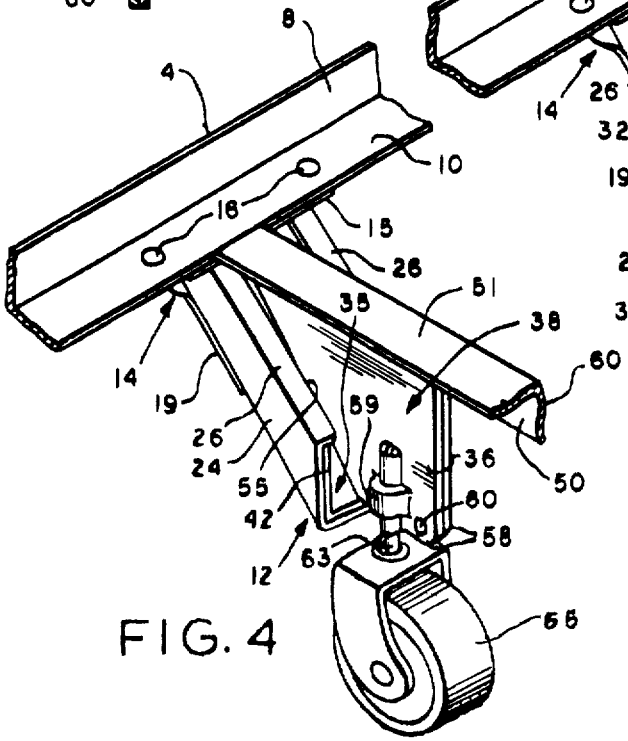
FIG. 4
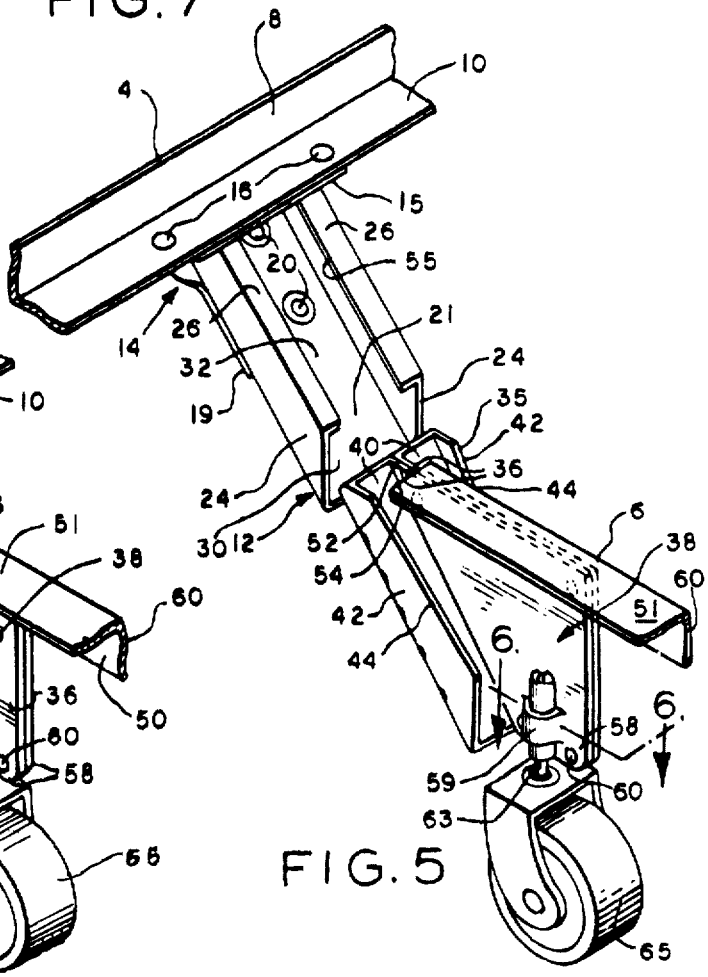
FIG. 5

BED FRAME ASSEMBLY

Matter enclosed in heavy brackets [ ] appears in the original patent but forms no part of this reissue specification; matter printed in italics indicates the additions made by reissue.

DISCUSSION OF THE PRIOR ART

The most pertinent art is applicant's own U.S. Pat. No. 3,683,429. The deficiency in such construction resides in having the wedge sockets on the side frames vertically disposed so that they present a hazard to a bare foot of the person approaching the bed in that he can easily stub his toe, etc. A further problem that develops in my previous construction is that the female member of the coupling must be secured to the vertical flange of the angle iron or L-shaped side rail. In order to provide an unobstructed outer edge on the side rails, the vertical flange must be on the inboard side of the [raid] *side rail* and the horizontal flange is at the top, and thus the advantage of having a mattress-confining upwardly extending flange on the outer edge of the side rail is lost. Separate retainers must be provided. Also the horizontal flanges of the side rails and of the cross-frame members are vertically offset since the side rail horizontal flanges must seat atop the horizontal flanges of the cross-members, which complicates laying of the bed springs since a single planor surface does not exist. The springs are supported only on their lateral edges unless additional cross braces are provided. Furthermore, more metal is required in the patented construction than in the instant invention. An extensive imbraced vertical web is provided in the old construction for attaching the caster wheel to the cross-frame member.

SUMMARY OF THE INVENTION

This invention relates to a novel bed frame structure in which the cross frames and the side frames are interconnected by a novel interlocking arrangement which not only facilitates assembly and disassembly but which also provides improved strength.

A further object of the invention is to provide a novel slidably interengaging male and female elements on the cross-frame and side-frame members respectively and wherein these elements are inclined inwardly from the ends of the cross-frame members and the side-frame members are movable diagonally inwardly and outwardly as well as vertically, and thus are adaptable to tightly embrace a bedspring frame therebetween to provide a novel tight assembly.

The invention also provides an attachment between the side frames and the cross frames which do not readily separate upon lifting of the bed by the side-frame members.

The invention also provides a novel coupling arrangement between the side frames and the cross frames, using mating male and female elements which slope downwardly and inwardly, the male element being preferably formed by oppositely directed end portions of a pair of vertically disposed side by side arranged plates which at their upper ends are preferably rivited to a vertical flange of the L-shaped cross-frame member, the end portions providing a diagonal reinforcing brace for the plates extending from a caster wheel attachment socket formed by semi-cylindrical outward offsets in the plates adjacent to the inboard edges of the plates to the upper outer edges of the plates.

The invention also has for its object the reduction of the amount of metal necessary to fabricate a male-female interlocking mechanism and at the same time to simplify the structure and improve its aesthetics.

Another object is to provide a novel easily separable interlocking arrangement between the side members and cross members of a bed frame in which the male elements are completely sheathed within the female elements and thus they mutually strengthen each other.

These and other objects and advantages inherent in and encompassed by the invention will become more readily apparent from the specifications and the drawings; wherein FIG. 1 is a perspective view of my novel bed frame shown in assembled position;

FIG. 2 is an enlarged cross-sectional view taken [essentially] *substantially* on line 2—2 of FIG. 1;

FIG. 3 is an enlarged cross-sectional view taken substantially on line 3—3 of FIG. 2;

FIG. 4 is a perspective view of a corner portion of the frame assembly;

FIG. 5 is a view similar to FIG. 4 showing the parts disassembled;

FIG. 6 is a cross-sectional view taken substantially on line 6—6 of FIG. 5; and

FIG. 7 is an enlarged cross-sectional view taken substantially on line 7—7 of FIG. 1.

DESCRIPTION OF THE INVENTION

The bed frame generally designated 2 is shown in the drawings as comprising a pair of side rails or frame-members 4,4 and cross-frame members 6,6 arranged generally as a rectangle.

Each side rail is an angle iron having a vertical outboard flange 8 and a horizontal flange 10 which extends inwardly from the flange 8.

A female socket element 12 is positioned adjacent to each end of each side rail and comprises a V-shaped attachment bracket 14 which has a horizontal flange portion 15 secured by rivets 16,16 to the bottom side 17 of the horizontal flange 10. Flange 15 joins at its outer edge in an apex 18 with the upper end of an inwardly and downwardly sloped web 19 which is positioned at approximately 45° to the vertical The web 19 extends beneath and is secured by rivets 20,20 to a similarly sloping bottom wall 21 of the female or socket member generally designated 12.

The female member 12 comprises in addition to the bottom wall 21 a pair of vertical side walls 24,24 extending upwardly from the lateral edges of the bottom wall. Walls 24 have sheared upper end edges 25,25 which seat flat against the underside of the attachment bracket flange 15. The sheared edges 25 continue at the upper ends of inturned flanges 26,26 which are formed at the upper edges of side walls 24,24. The upper end of the socket member fits complementally within the corner 28 formed by the flange 15 and wall 20. The socket element extends inwardly of the respective side rail and has an open lower end 30.

The socket provides a passageway 32 which receives a male or prong element generally designated 35 which is formed on the outboard edges of a pair of back-to-back disposed plates 36,36 of a caster wheel mounting bracket 38. Bracket 38 is provided at each end of each cross-member and the male member thereof extends diagonally along its outboard edge and is formed from the two plates 36,36. Each of these plates is bent laterally outwardly at right angles thereto to provide outwardly directed coplanar bottom wall portions 40,40 disposed at substantially the same angle as the bottom wall 21 for seating thereupon and sliding engagement therewith. The outer edges of the wall portions 40 are bent upwardly to provide vertical side flanges 42,42 which parallel walls 24,24 of the socket. Walls 42 terminate in upper edges 44,44 which converge with the plane of the bottom wall portion 40 toward the distal upper end of the prong at a small angle of approximately 5°-10° and complementally wedge beneath the similarly sloped inturned flanges 26,26 of the socket member.

The plates 36 of the bracket 38 are fastened adjacent to their upper edges 48 by a pair of rivets 49,49 to the vertical flange 50 of the associated cross-frame member 6 beneath the horizontal flange 51 which in the assembled position of the side-frame members with the cross-frame members are coplanar therewith (see FIG. 2).

It will be observed in FIG. 5 that the outboard ends 52 of the panels 36 project beyond the adjacent end 54 of the related cross [number] *member* and extend into the slot 55 defined by the inner edges 56 of the inturned flanges of the socket member.

The lower portions 58 of the plates 36 inwardly of the prong member as offset outwardly to provide vertical stem-admitting socket halves 59 which are secured together by a pair of rivets 60,60 extending through the plates at opposite sides of socket 61 which admits the stem or spindle 63 of a caster wheel assembly or abutment 65.

Thus it will be readily apparent that the male element not only serves as an interlocking means but also by extending transversely of the plates serves to rigidify the structure.

The cross-frame members are longitudinally adjustable and are interconnected by slidable interfitting extension elements 70,70, each of which have a horizontal flange 72 and vertical flange 74 (FIG. 7), and hook ends 75,76 which hook over the free edges of the flanges 50 and 51. A thumb screw 77 is threaded into each end of the flange 72 and locks against flange 51 of the associated section of the cross-frame member. It will be understood that the cross-frame members may also be of one piece construction. The instant structure, however, obtains the advantage that the cross members may be adjusted to closely approximating the width of the spring frame.

Inasmuch as the side rails have components of movement that are vertical as well as horizontal, the side rails may be raised slightly and spread apart wider than the bed springs and then the bed springs set thereupon, the weight of the springs and mattress causing side rails to slide downwardly or inwardly and tightly embrace the springs therebetween.

Having described a preferred embodiment of the invention, it will now become apparent that various forms of the invention will be envisioned by those skilled in the art which fall within the scope of the appended claims.

I claim:

1. A bed frame adapted to support a spring and mattress assembly comprising a pair of spaced, parallel side-frame member means and at least one cross-frame member means extending between said side-frame member means, *said side frame member means and said cross-frame member means each including a horizontal flange and a vertical flange,* and means releasably securing the ends of said cross-frame member means to said side-frame member means, comprising:

female elements connected to one of said cross-frame and side-frame member means *by a V-shaped bracket, each bracket including a first leg connected in surface abutting engagement with the horizontal flange of said one of said cross-frame and said side-frame member means, each bracket including a second leg extending downwardly and inwardly of said first leg and at an acute angle with respect thereto,* and male elements connected to the other of said side and cross-frame member means, said male-female elements disposed in sliding telescoping engagement with each other and sloping downwardly and inwardly from the lateral sides of the bed frame, said male-female elements defining bed-frame corner supports and being extendable and contractible laterally of said bed frame whereby said side-frame [members] *member means* being movable with the securing [elements] *means* connected thereto are spreadable apart different distances widthwise of the bed frame, and the telescoping male-female elements being cross-wise vertically superposed and mutually supportive to each other and resisting bending moments imposed thereon, *said female elements each including a bottom wall and a pair of spaced upstanding side walls respectively extending from opposite edge portions of said bottom wall, each of said side walls having an inwardly extending flange portion spaced from said bottom wall, said bottom and side walls and said flange portions defining a generally channel-shaped passageway for receiving a respective male element, means connecting the bottom wall of each female element in surface abutting engagement with the second leg of one of said V-shaped brackets, and each male element comprisng two plates arranged back to back and secured together, each plate having a generally vertical plate portion, and a bottom section extending outwardly of the bottom edge of the plate portion including an upturned side wall, said bottom sections together forming a bottom wall of the male element, said male elements being slidably receivable in said female elements so that said upturned side walls of each male element are disposed between said bottom wall and flange portions of each female element and adjacent to a side wall of each female element.*

2. The invention according to claim 1 [and] *wherein* each said male element *is* defined by a vertical support comprising *said* two plates [arranged back to back and] extending flatwise lengthwise of the cross-frame member means and having diagonal oppositely extending edge portions forming [a] *said* bottom [section of the male element and having portions at the lateral edges of said edge portions spacially disposed at opposite sides of the support and turned upwardly and forming side walls of said male element] *sections,* said side walls having upper edges tapering upwardly toward the upper end of said male element and each female element comprising a tapering passageway for reception of the associated male element.

3. The invention according to claim 1 [and means connecting each male element to said cross-member means comprising two plates having confronting portions] *said vertical plate portions confronting each other*

*and* collectively defining a downwardly open socket for reception of a floor engaging abutment, and said releasable *securing* means extending from the related side member means to adjacent said socket in mutually reinforcing relation to each other for substantially the entire extent thereof.

4. The invention according to claim 2 [and each said female element comprising a] *said* bottom wall *of each female element* sloping downwardly and inwardly from the adjacent [side] *side-frame* member [and having a pair of upright side walls and inturned wedge flanges at the upper ends of said side walls, said wedge flanges] *means, side flange portions of each said female element* converging with said bottom wall upwardly toward the [side rail] *side-frame member means.*

[5. A bed frame adapted to support a box spring and mattress comprisng a pair of spaced, parallel side-frame members, at least one cross-frame member extending between said side-frame members, and means releasably securing the ends of said cross-frame member to said side-frame members comprising female elements connected to one of said cross and side-frame members and male elements connected to the other of said side and cross-frame members, said elements disposed in sliding engagement with each other and sloping downwardly and inwardly from the lateral sides of said bed frame causing said side frame members to move downwardly and inwardly toward each other in embracing relation to a box spring interposed therebetween, and each said male element defined by two plates arranged back to back and having oppositely extending edge portions froming a bottom wall of the male element and having portions at the lateral edges of said of said edge portions turned upwardly and forming side walls of said male element, said side walls having upper edges tapering upwardly and toward the upper end of said male element, and each female element comprising a tapering passageway for reception of the associated male element, and each female element comprising a bottom wall sloping downwardly and inwardly from the adjacent side member and having a pair or upright side walls and inturned wedge flanges at the upper ends of said side walls, said wedge flanges converging with said bottom wall upwardly toward the side rail member, and a bracket securing the female element to the respective side member, the bracket being V-shaped and having an upper flange secured to the underside of the related side rail member and having a longer flange joined to the upper flange in an apex terminating at the outer side of the related side member, said bottom flange extending beneath the bottom wall of the associated female element and secured thereto and sloping downwardly and inwardly with said bottom wall.]

[6. A bed frame adapted to support a box spring and matress comprising a pair of spaced, parallel side-frame members, at least one cross-frame member extending between said side frame members, and means releasably securing the ends of said cross-frame member to said side-frame members comprising female elements connected to one of said cross and side-frame members and male elements connect to the other of said side and cross-frame members, said elements disposed in sliding engagement with each other and sloping downwardly and inwardly from the lateral sides of the bed frame causing said side-frame members to move downwardly and inwardly toward each other in embracing relation to a box spring interposed therebetween, and said cross-member comprising longitudinally adjustable sections for positioning said side-frame members in close confinement with the sides of the bed springs while said side rails are elevated above the cross-member and said male and female elements partially telescoped, whereby said bed springs and matress will cause said elements to fully telescope, drawing said side-members into tight engagement with said bed springs.]

[7. The invention according to claim 1 and said side rails each being L-shaped having an outer vertical flange and a horizontal flange extending inwardly from the vertical flange and providing a support surface, and said cross-member having an upper support surface positionable coplanar with the support surfaces of said side members.]

[8. A quadrilateral bed frame adapted to support a spring and mattress assembly comprising a pair of spaced parallel side-frame members and a pair of spaced cross-frame members extending substantially perpendicularly between said members extending substantially perpendicularly between said side-frame members, and means detachably securing each end of each cross-member to the adjacent side-frame member, comprising male and female slidably interengaging elements, one of said male-female elements being secured to the side-frame member and the other of said elements being secured to the cross-frame member, cooperating male-female elements being disposed at an angle to the vertical and sloping from the outer edge of the bed frame crosswise of the respective side-frame member to a position beneath the respective end of the associated cross-frame member to a terminous inwardly of the inner edge of the respective side-frame member and providing foot clearance for a person moving about the edge of the bed, said male-female elements telescoping with each other and said side-frame members being concurrently spreadable and contractable for receiving different widths of spring assembly therebetween.]

[9. The invention according to claim 8 and said side-frame members being L-shaped and having an outer vertical flange and a bottom horizontal flange extending inwardly therefrom and said female elements attached to the underside of the horizontal flange and projecting downwardly and inwardly of the associated side rail.]

[10. The invention according to claim 9 and each said female element having a longitudinal slot therein and said male element being secured to the adjacent end of the associated cross member and having an upper portion projecting outwardly of said adjacent end and a lower portion projecting inwardly of the adjacent end of the assocaited end member and said upper portion having at least a part extending through said slot in the telescoped position of said male-female elements.]

* * * * *